United States Patent
Pinto

(10) Patent No.: US 9,339,015 B2
(45) Date of Patent: May 17, 2016

(54) REMOVABLE DOG ACCESSORY

(71) Applicant: Caryn Susan Pinto, Chantilly, VA (US)

(72) Inventor: Caryn Susan Pinto, Chantilly, VA (US)

(73) Assignee: Caryn Pinto, Chantilly, VA (US)

( * ) Notice: Subject to any disclaimer, the term of this patent is extended or adjusted under 35 U.S.C. 154(b) by 18 days.

(21) Appl. No.: 14/457,033

(22) Filed: Aug. 11, 2014

(65) Prior Publication Data

US 2015/0056403 A1  Feb. 26, 2015

Related U.S. Application Data

(60) Provisional application No. 61/864,701, filed on Aug. 12, 2013.

(51) Int. Cl.
*A01K 27/00* (2006.01)

(52) U.S. Cl.
CPC ....... *A01K 27/006* (2013.01); *Y10T 428/24008* (2015.01)

(58) Field of Classification Search
CPC .................. Y10T 428/24008; A01K 27/006
See application file for complete search history.

(56) References Cited

U.S. PATENT DOCUMENTS

2013/0273304 A1* 10/2013 Blue .................. B32B 3/06
428/99

* cited by examiner

*Primary Examiner* — Alexander Thomas

(57) ABSTRACT

The present invention leverages various dog platforms, including collars, harnesses, and leashes to provide owners a way to add style or originality to their dog's look. The invention provides removable dog accessories that attach to any platform and do not require removing the platform from the pet or permanently altering the structure of platform; provide an avenue to enhance a dog's overall day-to-day appearance or for special occasions and/or holidays.

4 Claims, 1 Drawing Sheet

REMOVABLE DOG ACCESSORY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND

Dogs have evolved into integral family members over the years. As such, many pet owners attempt to add style or originality to their dog's look. Clothing for dogs is one option, but can be expensive and some dogs may not cooperate when their owners put these clothes on or while wearing them for any period of time. Dog collars, harnesses, or leashes (hereafter referred to as platforms), in particular, provide a useful platform to enhance a dog's overall day-to-day appearance or for special occasions and/or holidays. However, current options limit or do not offer interchangeability; require the purchase of a specifically designed platform; entail permanently modifying a platform; or involve removing the platform from the dog. One existing option is to purchase a platform that comes with an accessory (e.g., a flower) already attached. This option eliminates interchangeability of accessories and requires the purchase of an entirely new platform when the owner becomes tired of the platform or accessory. A second option currently available requires the purchase of a specifically designed platforms. This option limits interchangeability by forcing owners to use only compatible accessories. In addition, if the method for connecting accessories on these specifically designed platforms (e.g., Velcro, eyelet, etc.) breaks or wears, the owner would likely have to purchase a new platform altogether. Similar to option two, an owner can permanently affix a connector to the platform and could make accessories to fit the connection. This offers interchangeability, but permanently alters the platform in the process. A final existing option involves removing the platform from the dog and sliding an accessory over the platform to either completely cover the platform or attach a small decoration. This offers interchangeability without permanently altering the platform, but requires removing the platform from the animal before attaching the accessory. Removing a platform, mainly a collar or harness, and putting it on again can be difficult, depending on the temperament of the pet, and may dissuade an owner from accessorizing their dog's collar, harness, or leash.

None of these methods necessarily provide pet owners an optimal option for accessorizing their dog platforms—the need exists for removable accessories that can attach to any platform, without having to remove the platform from the animal, or permanently altering the platform.

BRIEF SUMMARY OF THE INVENTION

The invention provides removable dog accessories capable of attaching to any platform; do not require removing the platform from the pet, or permanently altering the structure of the platform. The removable dog accessory consists of a strap, such as elastic or leather; a flexible, but sturdy material (hereafter referred to as backing), for example stiffened felt or leather; a connecting mechanism (hereafter referred to as a connector), including a snap, fastener, hook, or eyelet; and a decoration, for instance a floral design. The strap wraps around any platform, without having to remove the platform or permanently altering the structure of the platform, and providing a tight, secure method for attaching removable dog accessories.

DETAILED DESCRIPTION OF THE INVENTION

Figure 1:
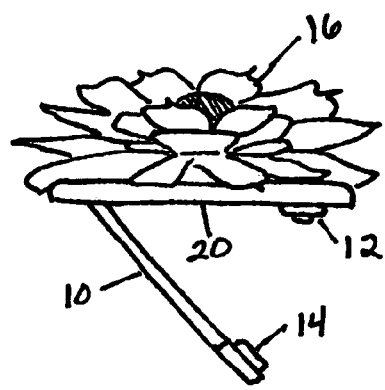
FIG. 1 is a side view of the removable dog accessory.
Figure 2:
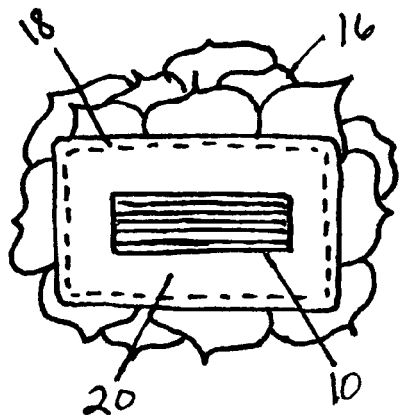
FIG. 2 is a bottom view of the removable dog accessory.

The present invention provides removable dog accessories that attach to any platform and do not require removing the platform from the pet or permanently altering the structure of the platform. The removable dog accessory (FIG. 1) consists of four main components: a strap, backing, connector, and a decoration.

Figure 3:
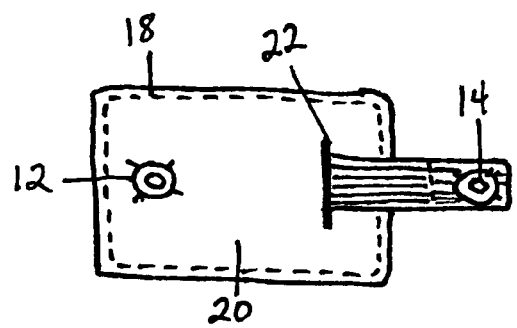
FIG. 3 is a bottom view of the backing, consisting of a strap, backing, and connector.
Figure 4:
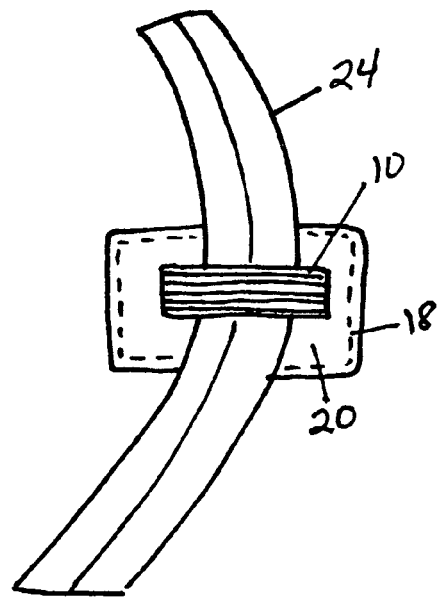
FIG. 4 illustrates how the backing attaches to a platform.

The first component is a strap (10), consisting of elastic. The current embodiment of the strap is ½ an inch wide and a variable length. The length is dependent on the width of the platform, as the strap must wrap around the platform. One end of the strap (10) is inserted through a slit (22) in one of two pieces, comprising the backing (20), as depicted in FIG. 3. Additionally, the strap (10) is affixed to the backing to ensure it remains attached. Affixed to the opposite end of the strap (10) is the male or female end of a connector (14). In the current embodiment, the female end (14) is affixed to the strap.

The second component, as already mentioned, is the backing (20). The backing consists of two pieces of flexible, but sturdy material; stiffened felt is used in the current embodiment. The two pieces of material are sewn together (18) in the current embodiment. One piece of the backing (20) includes a slit (22) that allows for one end of the strap (10) to be inserted, and is then sewn to the backing. On the same piece of backing (20) the opposite end of the connector, the male end (12) in the current embodiment, is affixed. The decoration, the fourth component, (16) affixes to the second piece of material and faces away from the animal. The backing (20) prevents the accessory (16) from rubbing directly against the platform (24) and provides added support to the entire structure.

The third component in the current embodiment is a connector. As previously stated above, one end of the connector (14) is affixed to one end of the strap (10) while the opposite end of the connector (12) is affixed to the backing (20). The connector (12 and 14) provides a secure method for attaching the accessory to the platform (24).

The final component in the current embodiment is a decoration (16), such as a floral design. The decoration (16) affixes to the opposite side of the backing (20) from where the strap (10) and connector (12) are attached, facing away from the pet.

Together, these four components form a removable dog accessory capable of quickly, easily, and securely attaching to any dog platform, without first having to remove the platform from the pet, and is interchangeable. The strap (10) wraps around a platform (24) and is held in place by the connector (12 and 14). If desired, the attachment can slide from side to side on the platform (24), without removing the platform (24).

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A removable dog accessory comprising:
   a strap terminating at the distal end;
   a backing, comprising:
      a first piece providing a first surface defined by a first periphery; and
      a second piece comprising:
         a second surface and an opposing surface, each defined by a second periphery; and
         a slot communicating from the second surface to the opposing surface, wherein the first and second pieces are coextensive, wherein the first and second pieces are attached so that the first and second peripheries align, and wherein the first and second surfaces face opposing directions;
   the strap attached to the opposing surface, and wherein the strap extends from the opposing surface and through the slot;
   a female connector provided near the distal end;
   a male connector provided along the second surface; and
   a decoration provided on the first surface.

2. A removable dog accessory as recited in claim 1 wherein the strap comprises of a material capable of fitting around any platform.

3. A removable dog accessory as recited in claim 1 wherein the backing comprises flexible, but sturdy material.

4. A removable dog accessory as recited in claim 1, wherein the strap is sewn to the backing.

* * * * *